United States Patent
Lazri et al.

(10) Patent No.: US 11,997,070 B2
(45) Date of Patent: May 28, 2024

(54) TECHNIQUE FOR COLLECTING INFORMATION RELATING TO A FLOW ROUTED IN A NETWORK

(71) Applicant: ORANGE, Paris (FR)

(72) Inventors: Kahina Lazri, Chatillon (FR); Sylvie Laniepce, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 158 days.

(21) Appl. No.: 17/287,768

(22) PCT Filed: Oct. 16, 2019

(86) PCT No.: PCT/FR2019/052449
§ 371 (c)(1),
(2) Date: Apr. 22, 2021

(87) PCT Pub. No.: WO2020/084222
PCT Pub. Date: Apr. 30, 2020

(65) Prior Publication Data
US 2021/0400020 A1     Dec. 23, 2021

(30) Foreign Application Priority Data

Oct. 23, 2018 (FR) ...................................... 1859793

(51) Int. Cl.
*G06F 21/00*     (2013.01)
*H04L 9/40*      (2022.01)

(52) U.S. Cl.
CPC ................................ *H04L 63/0263* (2013.01)

(58) Field of Classification Search
CPC . H04L 63/0263; H04L 63/1416; H04L 45/64; H04L 45/54; H04L 63/1458
See application file for complete search history.

(56) References Cited

U.S. PATENT DOCUMENTS

2014/0177634 A1* 6/2014 Jiang ....................... H04L 45/74
                                                              370/392
2014/0189867 A1   7/2014 Jung et al.
(Continued)

OTHER PUBLICATIONS

English translation of the Written Opinion of the International Searching Authority dated Apr. 27, 2021 for corresponding International Application No. PCT/FR2019/052449, filed Oct. 16, 2019.
(Continued)

*Primary Examiner* — Michael M Lee
(74) *Attorney, Agent, or Firm* — David D. Brush; Westman, Champlin & Koehler, P.A.

(57) ABSTRACT

A technique for collecting information relating to a flow routed in a communication network. This network includes, in a data plane, packet-processing devices that are configured so as to process packets on the basis of flow-processing rules and, in a control plane, at least one control device that is configured so as to control packet-processing devices and to manage the flow-processing rules. An analysis device identifies at least one flow-processing rule configured so as to process a flow including a first characteristic associated with a first endpoint device of a flow to be sought in the communication network and applied by a processing device. Based on the identified processing rule, the control device determines a second characteristic associated with a second endpoint device.

9 Claims, 2 Drawing Sheets

(56) References Cited

U.S. PATENT DOCUMENTS

| | | | | |
|---|---|---|---|---|
| 2016/0212048 | A1* | 7/2016 | Kaempfer | H04L 45/54 |
| 2017/0195236 | A1* | 7/2017 | Arimatsu | H04L 45/02 |
| 2017/0310586 | A1* | 10/2017 | Lin | H04L 45/56 |
| 2017/0339109 | A1* | 11/2017 | Zeng | H04L 9/40 |
| 2018/0063197 | A1* | 3/2018 | Pope | H04L 63/0227 |
| 2018/0152475 | A1 | 5/2018 | Park et al. | |
| 2018/0191679 | A1* | 7/2018 | Mulka | H04L 45/38 |

OTHER PUBLICATIONS

International Search Report dated Dec. 18, 2019 for corresponding International Application No. PCT/FR2019/052449, dated Oct. 16, 2019.

Written Opinion of the International Searching Authority dated Dec. 18, 2019 for corresponding International Application No. PCT/FR2019/052449, filed Oct. 16, 2019.

* cited by examiner

TECHNIQUE FOR COLLECTING INFORMATION RELATING TO A FLOW ROUTED IN A NETWORK

CROSS-REFERENCE TO RELATED APPLICATIONS

This Application is a Section 371 National Stage Application of International Application No. PCT/FR2019/052449, filed Oct. 16, 2019, the content of which is incorporated herein by reference in its entirety, and published as WO 2020/084222 on Apr. 30, 2020, not in English.

FIELD OF THE DISCLOSURE

The invention pertains to the general field of telecommunications.

The invention relates more particularly to a technique for collecting information relating to a flow routed in a communication network. It is applied to particular benefit in the context of network security, more specifically the security of network endpoints, and in particular in protection against denial of service attacks.

BACKGROUND OF THE DISCLOSURE

The collection technique lies in the field of communication networks for which the data plane and the control plane are decoupled. Such a network comprises, in a data plane, packet-processing devices that are configured so as to process packets on the basis of flow-processing rules and, in a control plane, at least one control device that is configured so as to control packet-processing devices, in particular to manage the flow-processing rules that they apply. These networks are also known by the name of software-defined communication network or SDN for "software-defined networking". As is known, an SDN network architecture makes it possible to decouple the control and data planes by centralizing the intelligence of the network (that is to say the control functions of the network) in a control device. The behavior of the processing devices is then defined by flow-processing rules received from the control device, such as data (i.e. traffic) processing or transfer rules. The SDN concept is based on the OpenFlow™ communication protocol defined by the ONF (Open Networking Foundation), which allows simplified programming of processing devices via a standard interface.

Moreover, many types of denial of service attack are known (reference is usually made to DoS, for "denial of service", or DDoS, for "distributed denial of service"): network layer denial of service attacks and application layer denial of service attacks.

Network layer denial of service attacks consist in sending a large number of network packets to a target service, for example an equipment of a network or a Web server, so as to mobilize resources in the processing of these packets. This has the effect of saturating the resources of the target service and of making these resources unavailable for processing of legitimate requests. Network layer denial of service attacks are characterized primarily by sending a significant number of network packets. A more severe variant of this attack is the distributed denial of service attack, in which the attacker uses multiple sources to attack one or more targets. This type of attack may be carried out using a group of source computers infected with malicious software ("malware"). This type of attack is commonly called a reflection attack: the attacker sends a flow to multiple computers, which will transfer them to the same target, themselves becoming sources.

The detection of such attacks is based primarily on quantitative analysis of the requests received by an equipment of the network or of the target service. Denial of service attacks are very common due to their ease of implementation. Current detection mechanisms are based primarily on the analysis of packets received by a destination IP address. There are two main modes of analysis for detecting this type of attack:

Edge filtering: filtering is set up at the entrance to a communication network to be protected. To this end, firewalls may be provided in order to block certain transport protocols, ports or IP addresses that are blacklisted. These stateful firewalls may also perform the role of traffic limiters by blocking, starting from a certain preconfigured traffic volume threshold, certain source IP addresses destined for a destination IP address. However, the firewall or load balancer used for edge filtering is exposed to unfiltered traffic and may itself be the first victim of the DDoS. Moreover, this approach is effective only for detecting known attacks (source IP addresses, protocols, suspicious and known malicious series of packets destined for a given IP address);

Redirection to a specialized equipment or probe: the traffic destined for a given IP address is redirected to a specialized probe for analysis. These probes implement sophisticated learning algorithms and have sophisticated analysis capabilities, depending on geographic location, application protocols, analysis of encrypted flows, etc. However, the response is not immediate and requires a few minutes (during which the infrastructure remains exposed to the attack). When the network architecture allows this, the probe may be interposed in the flow. If not, it is necessary to perform a redirection by way of a traffic routing modification in order to redirect all legitimate and malicious traffic to this probe. In the event of incorrect settings, this may lead to ineffective detection or even loss of legitimate traffic.

Thus, current techniques for detecting denial of service attacks perform statistical analysis of network traffic (saturation of resources, suspect transport protocol (for example UDP for User Datagram Protocol), suspicious port, etc.) to a given target. Traffic considered to be malicious is blocked or redirected, and detection is often performed on the basis of a given source IP address in order to protect a given destination IP address.

SUMMARY

One of the aims of the invention is to remedy inadequacies/drawbacks of the prior art and/or to make improvements thereto.

According to a first aspect, the invention relates to a method for collecting information relating to a flow routed in a communication network. This network comprises, in a data plane, packet-processing devices that are configured so as to process packets on the basis of flow-processing rules and, in a control plane, at least one control device that is configured so as to control packet-processing devices and to manage said flow-processing rules. The method comprises, for an analysis device:

identifying at least one flow-processing rule configured so as to process a flow comprising a first characteristic associated with a first endpoint device of a flow to be sought in the communication network and applied by a processing device;

determining a second characteristic, associated with a second endpoint device, based on the identified processing rule.

A packet flow or network flow is characterized by a set of values present in fields of a header of the packet, allowing the packets of this flow to be routed in a communication network. The network flow is in particular characterized by two endpoint devices, one of the two devices corresponding to the device sending the network flow and the other device corresponding to the device receiving the network flow.

By virtue of this information collection technique, it is thus possible to identify, in a communication network, second endpoint devices of a flow having, at its end, a first device with which the first characteristic is associated. A flow to be sought is a flow whose characteristics have been identified during security analysis. The first characteristic corresponds for example to a source address associated with one of the endpoint devices of an attacking flow, corresponding in this example to a sender device. This technique thus makes it possible to identify other targets of an ongoing denial of service attack initiated by the sender device. This technique also makes it possible to identify computers used as sources by an attacker to attack one or more targets in the case of a distributed denial of service attack. This technique furthermore makes it possible to identify other sources of a distributed denial of service attack from a destination address associated with one of the endpoint devices of an attacking flow, corresponding in this example to a receiver device.

The proposed technique thus takes advantage of the centralized view enjoyed by an analysis device designed to communicate with a control device, through the flow-processing rules that the control device manages, thus allowing a network operator to obtain information relating to a denial of service attack. This makes it possible to reduce response times in the presence of a detected attack.

The various embodiments or embodiment features mentioned hereinafter may be added independently or in combination with one another to the collection method such as defined above.

In one particular embodiment, the collection method comprises obtaining the first characteristic associated with the first endpoint device of a flow to be sought in the communication network.

In one particular embodiment, the collection method comprises a command to install, in at least one processing device, a processing rule specific to the first characteristic and to the second characteristic.

In this particular embodiment, the method thus takes advantage of the fact that the analysis device is able to command the control device to install new processing rules in the processing devices that it controls. A new specific processing rule is thus installed by the control device in one or more processing devices. Since the routing in the network evolves dynamically, it is preferable to install the specific processing rule throughout the network when it is necessary to observe the attacking flow.

In one particular embodiment, when the identified processing rule is configured so as to process at least one second flow separate from the flow to be sought, the collection method comprises a command to install, in the processing device applying the identified rule, a processing rule specific to the first characteristic and to the second characteristic.

In this particular embodiment, the specific processing rule is installed in a processing device that has been identified as contributing to the routing of the flow to be sought. This processing device applies the processing rule that has been identified as being configured so as to process a flow comprising the first characteristic. This new specific processing rule will make it possible to determine whether this identified processing device is actually routing packets of the flow to be sought. Specifically, in this particular embodiment, the processing rule that has been identified is a rule governing the flow to be sought. The new specific processing rule thus makes it possible to rule out the processing device applying the identified processing rule when it is not ultimately contributing to the processing of the flow to be sought.

According to one particular feature, the collection method comprises obtaining information representative of an activity of the specific processing rule.

Once a specific processing rule has been installed in the processing device, the analysis device may use the control device to obtain various information to determine whether the specific processing rule has been active for an observation period. This may be a counter implemented in the processing device and counting a number of packets processed using the specific processing rule. This may also be a notification sent from the processing device to the control device indicating that the specific processing rule is not active, sent for example upon expiry of a timeout period.

Obtaining the counter also allows the network operator to quantify the impact of the denial of service attack.

In one particular embodiment, the flow to be sought is furthermore characterized by a destination address, and installation of a specific processing rule is commanded in at least one processing device, said specific processing rule being configured so as to process flows comprising the first characteristic and destined for a subnetwork to which the destination address belongs.

In this particular embodiment, the method thus takes advantage of the fact that the analysis device is able to command the control device to install a new specific processing rule in a processing device. This new processing rule will make it possible to extend the collection of information relating to the sought flow to receiver devices belonging to the same subnetwork as the target of the attack. It is then possible for example to analyze the behavior of the network access mechanism of a company subjected to an attack and to judge the saturation of its network access mechanisms.

According to a second aspect, the invention relates to an analysis device designed to communicate with a control device. The control device is attached to a control plane in a communication network and is configured so as to control packet-processing devices attached to a data plane in said network and to manage flow-processing rules applied by said processing devices in order to process packets. The analysis device comprises:

an identification module, designed to identify at least one flow-processing rule configured so as to process a flow comprising a first characteristic associated with a first endpoint device of a flow to be sought in the communication network and applied by a processing device;

a determination module, designed to determine a second characteristic, associated with a second endpoint device, based on the identified processing rule.

The advantages explained for the method for collecting information relating to a flow routed in a communication network according to the first aspect may be transposed directly to an analysis device.

In one particular embodiment, the analysis device comprises a module for obtaining the first characteristic associated with a first endpoint device of a flow to be sought in the communication network.

This analysis device may of course include, in structural terms, the various features relating to the information collection method as described above, which features may be combined or taken individually.

According to a third aspect, the invention relates to a system for collecting information relating to a flow routed in a communication network. This system comprises, in a data plane, packet-processing devices that are configured so as to process packets on the basis of flow-processing rules, in a control plane, at least one control device that is configured so as to control packet-processing devices and to manage said flow-processing rules, and an analysis device according to the second aspect.

The advantages explained for the method for collecting information relating to a flow routed in a communication network according to the first aspect may be transposed directly to the collection system.

According to a fourth aspect, the invention relates to a program for an analysis device, comprising program code instructions intended to control the execution of the steps of the above-described method for collecting information relating to a routed flow that are implemented by an analysis device when this program is executed by this analysis device, and to a recording medium able to be read by an analysis device and on which a program for an analysis device is recorded.

The advantages explained for the method for collecting information relating to a routed flow according to the first aspect may be transposed directly to the program for an analysis device and to the recording medium.

BRIEF DESCRIPTION OF THE DRAWINGS

The technique for collecting information relating to a flow routed in a communication network will be better understood with the aid of the following description of particular embodiments, with reference to the appended drawings, in which.

DETAILED DESCRIPTION OF ILLUSTRATIVE EMBODIMENTS

Figure 1:
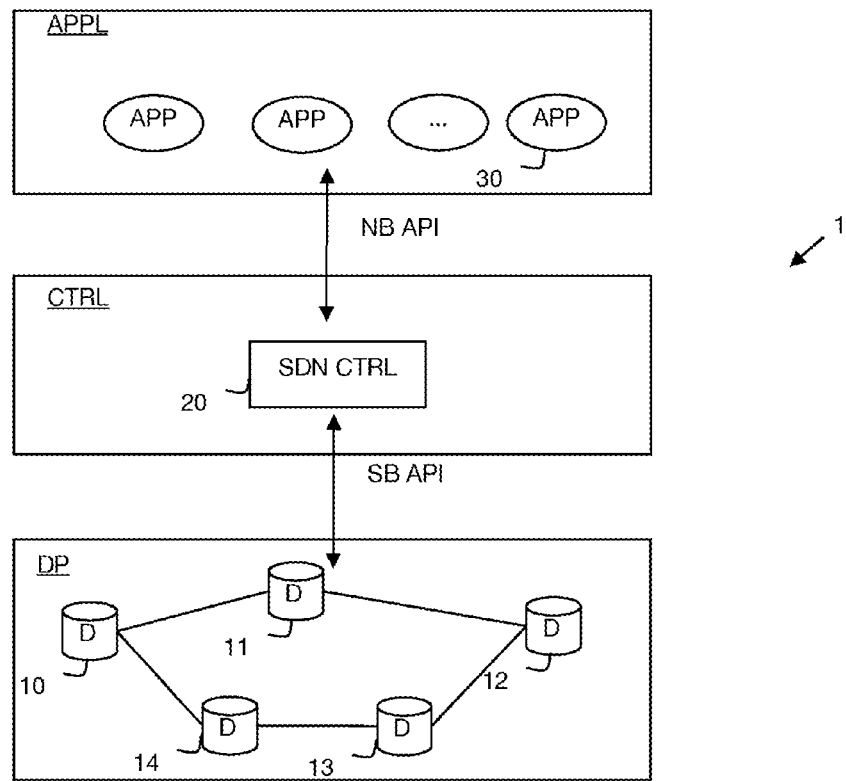
FIGS. 1 and 2 illustrate the principles of a software-defined communication network.
Figure 2:
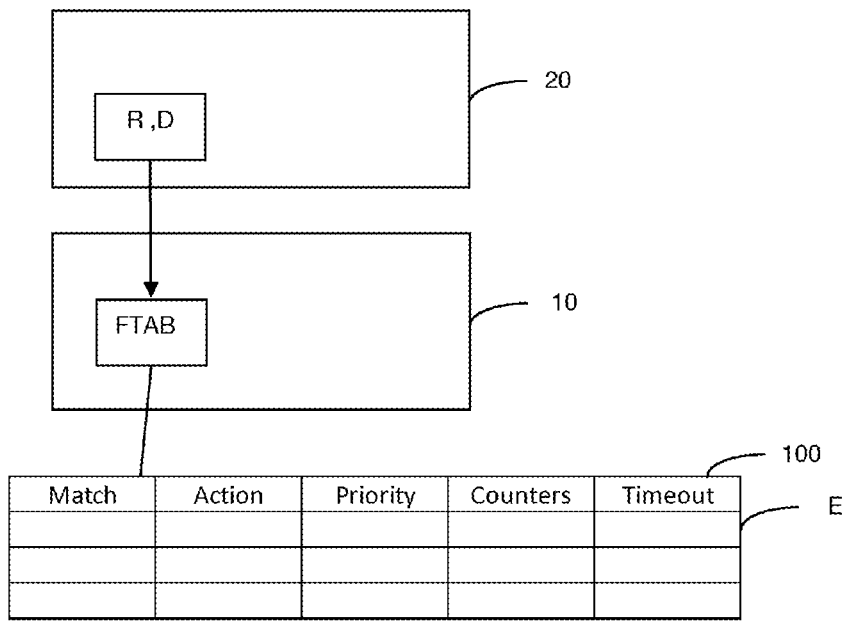

For ease of understanding of the technique for collecting information relating to a flow routed in a communication network, the general principles of an architecture of a software-defined communication network SDN ("software-defined network") will be briefly recalled with reference to FIGS. 1 and 2. Such an architecture is described in detail in the document published by the ONF ("Open Networking Foundation") entitled "Software-Defined Networking: The New Norm for Networks", 13 Apr. 2012. In the example used to illustrate these principles, the SDN architecture is based on the use of the OpenFlow™ protocol.

FIG. 1 shows a software-defined communication network in which the method for collecting information relating to a flow routed in this network is implemented in one particular embodiment.

As mentioned above, the SDN concept makes it possible to specify the behavior of network equipment or processing devices using high-level control programs, thereby making it possible to easily automate certain tasks such as configuring processing devices of the network or managing policies (or services) applied in the network.

To this end, the SDN architecture centralizes the intelligence of the network (that is to say the control functions of the network and its processing devices) in a software control device (or controller). In the embodiment described here, the control device is a programmable software control device that commands processing devices or switches using processing rules, via the OpenFlow™ protocol. The OpenFlow™ protocol is described in particular in the document "*Openflow switch specification, version* 1.5.1", March 2015.

The behavior of the processing devices in the presence of data relating to a terminal or more precisely to a communication session is then defined by the control device by way of what are known as processing or transfer rules that are transmitted to the processing devices. These rules are stored by the processing devices in what are known as flow tables and are intended to be applied thereby upon reception of data flows or packets. They specify in particular the processing devices to which the data (i.e. the traffic) should be transferred.

FIG. 1 summarizes this operating mode by schematically modeling an SDN architecture in three layers:

a bottom layer DP, modeling the data plane and comprising processing devices D 10-14 (or network equipment) commanded (controlled) by a control device 20 (these devices D may be either physical or virtual);

an intermediate layer CTRL, modeling the control plane and comprising the control device 20 referenced "SDN CTRL"; and a top layer APPL, modeling the application plane, comprising various control functions or applications APP used by the control device 20 to command the processing devices 10-14 of the data plane DP and to formulate the processing rules.

The various abovementioned layers communicate with one another via programming interfaces or APIs ("Application Programming Interface"), called "NorthBound API" and "SouthBound API" (respectively denoted "NB API" and "SB API" in FIG. 1).

The programming interfaces SB API between the control device 20 and the processing devices 10-14 in the data plane in this case implement the OpenFlow™ communication protocol.

The processing devices 10-14 of the data plane that are controlled by the control device 20 using the OpenFlow™ protocol correspond for example to switching devices or switches, as they are known in the OpenFlow terminology.

The programming interfaces NB API may implement any open communication protocol, for example the XMPP communication protocol.

As recalled above and illustrated in FIG. 1, the OpenFlow™ protocol allows the control device 20 to command each processing device 10-14 (for example each switch) by way of a set of packet-processing rules, including in particular packet transfer (or routing) rules intended to be applied by the processing device upon reception of packets relating to a network flow.

These processing rules are determined by the control device 20, for example on the basis of the operator's policy intended for the management of the network. They specify the processing rule(s) that should be applied by each processing device upon reception of a packet of a data flow having common characteristics, and subsequent packets associated with the same flow.

These processing rules are stored in each processing device 10-14 in the form of flow tables FTAB, the entries in which may be modified by the control device 20 using the OpenFlow™ protocol (for example addition, updating, deletion of entries in the table).

In the application plane, an analysis device 30 implements a security function. This analysis device 30 is able to communicate with one or more control devices 20. It is able in particular:
- to access all of the flow-processing tables implemented by the processing devices under the control of a control device;
- to command a control device to install a processing rule in a processing device;
- to access information relating to the activity of a rule, for example various counters implemented by the processing devices.

By way of illustration, an entry E in such a flow table FTAB 100 is shown in FIG. 2. It takes the form of a plurality of fields or parameters intended to be examined by the processing device 10 upon reception of a data packet, with a view to identifying which processing rule(s) should be applied to this packet (for example to which processing device this packet should be transferred). These fields and parameters are represented by the term Match. This is a bit sequence that forms a predicate with respect to which all of the packets that correspond to the predicate are considered to belong to one and the same flow. This bit sequence allows the processing device to discriminate between the packets at input. These fields include for example source and/or destination address values, such as MAC (Medium Access Control), source or destination addresses, and/or IP, source or destination addresses, and/or communication port numbers, etc. One or more fields may be specified for each entry. This/these specifies/specify the fields that should be present in the header of the packets to which this entry E in the flow table relates.

Each entry E in the table also defines an Action field defining the processing to be applied to a packet corresponding to the predicate (transfer to another table, transfer to a given equipment on the network, delete the packet, modify the header of the packet, etc.). Other fields may also be defined, such as a priority level Priority associated with the processing rule, a counter Counter counting the number of packets corresponding to the predicate and that have been processed using this rule, a duration Timeout associated with the validity of the rule. This duration may correspond to a maximum duration (hard-timeout) of validity of the rule or else to a duration (idle-timeout) at the end of which the rule expires if it remains inactive for this duration.

The processing device 10-14 uses the flow tables FTAB thus defined as follows. Upon reception of a data packet, the processing device 10-14 searches in the flow-processing tables FTAB that it has stored as to whether the predicate of the packet corresponds to a Match entry in the table. As the case may be, the instructions associated with this entry and indicated in the Action field are executed by the processing device 10-14 on the data packet.

If on the other hand no entry in the table coincides with the header of the received packet, the packet will automatically correspond to a processing rule called table-miss, which may have the associated action of sending a Packet-In to the control device 20 in order to request the installation of a new entry in the table, in other words a new processing rule. This rule update mode corresponds to a reactive mode.

The OpenFlow rules may also be updated in a proactive mode, in which the control device 20 installs the flow-processing rules beforehand, before the arrival of the first packets (it is therefore assumed here that the control device has advance knowledge of the data flows that will be received by the processing devices).

The control and data planes within the SDN architecture are thus well decoupled.

Of course, no limit is attached to the number of processing devices located in the data plane or to the number of control devices in the control plane.

The control device 20 commands a plurality of processing devices. More precisely, it defines, in a data plane, processing rules that should be applied by the processing devices 10-14 to the data packets that they receive. These processing rules are provided by the control device 20 to the processing devices that it controls based on the OpenFlow™ protocol.

The processing rules provided by the control device 20 are stored in each processing device 10-14 in flow-processing tables, the entries in which are able to be easily modified (for example addition, updating, deletion of entries in the table) using the OpenFlow™ protocol.

The processing rules used by the control device 20 to command the processing devices 10-14 are in this case transfer rules for the IP data packets received by these equipments and identifying, on the basis of various criteria met by the header of these packets (for example source or destination MAC or IP address), the processing device to which these packets should be transferred.

The processing devices 10-14 are moreover configured so as to call on the control device 20 via an OpenFlow™ protocol message when they receive a data packet that does not correspond to any entry in their respective flow tables. Upon reception of this message, the control device 20 creates an appropriate processing rule and updates the flow tables of the processing devices in question.

Figure 3A:
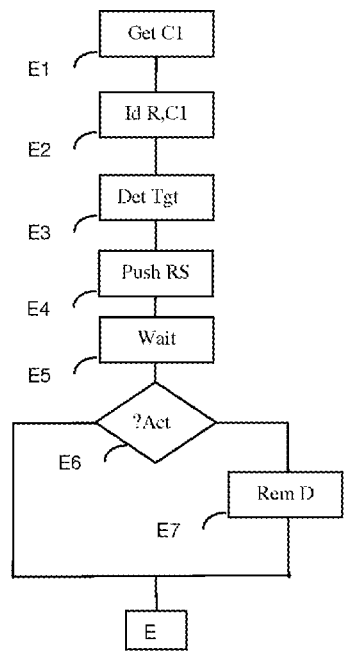
FIGS. 3a and 3b illustrate steps of a method for collecting information relating to a flow routed in a communication network according to two particular embodiments.

The method for collecting information relating to a flow routed in a communication network, implemented by the analysis device, will now be described with reference to FIG. 3a. As described above, the communication network comprises:
- in a data plane, network equipment or packet-processing devices that are configured so as to process packets on the basis of flow-processing rules,
- in a control plane, at least one control device 20 designed to control the packet-processing devices 10-14 and to manage said flow-processing rules and,
- in an application plane, an analysis device 30.

In a step E1, the analysis device 30 obtains a first characteristic (Get C1) associated with a first endpoint device of a flow to be sought in the communication network. This first endpoint device is for example a sender device that has been identified as an attacker attacking one or more second endpoint devices (as receiver devices corresponding to the targets of an attack). This first characteristic is sent for example to the analysis device 30 by a security application. This security application is for example an anti-virus application running locally in an endpoint device.

In a step E2, the analysis device 30 identifies (Id R,C1) at least one flow-processing rule configured so as to process a flow comprising (or having) the first characteristic from a storage memory 30I storing all of the flow-processing rules controlled by the control device 20 (and applied by processing devices 10-14). Each of the processing rules is stored in association with an identifier of the processing device 10-14 that applies this rule.

In a step E3, the analysis device 30 determines a second characteristic (Det Tgt) associated with a second endpoint device on the basis of the identified processing rule or rules. This makes it possible to determine other endpoint devices associated with the ongoing attack.

By way of illustration, a network flow responsible for a network layer packet flooding-based denial of service attack targets a network endpoint such as a web server. This network flow, called attacking network flow, is characterized simply by a given source IP address, that of the source of the attack (first endpoint device). The first characteristic corresponds for example to an IPv4 source IP address 192.1.2.1. The flow-processing rules that make it possible to process a flow comprising this source IP address, regardless of the destination IP address, are thus identified (E2). Based on these identified processing rules, it is thus possible to determine (E3), as second characteristic of the flow, the destination IP address. The flow is associated with the ongoing attack because it originates from the source IP address of a flow identified as an attacker. Two packets originating from this same source IP address (and as the case may be destined for different destination IP addresses) thus belong to flows forming part of the ongoing attack. The determined destination IP address or addresses correspond to the second characteristic and make it possible to determine new targets of the ongoing attack (second endpoint devices).

Still by way of illustrative example, in the context of a distributed denial of service DDoS attack, the attacking flow defined by a source IP address may use several other source computers (as sender devices) to carry out its attack. A first iteration of steps E1-E3 thus makes it possible to identify, using the source IP address as a first characteristic, destination IP addresses associated with the other source computers (second characteristic). New iterations of steps E1-E3 for each of the other sources (as first characteristics for these iterations) make it possible to identify, as the case may be, other targets of the ongoing attack (second characteristics). This monitoring of attacking network flows therefore makes it possible to detect, over the entire network, other targets and/or sources involved in the detected attack on a first target.

Still by way of illustrative example, in the context of a distributed denial of service DDoS attack, a first iteration of steps E1-E3 thus makes it possible to identify, using the source IP address as a first characteristic, a destination IP address associated with a target of the ongoing attack (second characteristic). New iterations of steps E1-E3 for the destination IP address as a first characteristic make it possible to identify, as the case may be, the other source computers involved in the ongoing attack (as second characteristics for these iterations). This monitoring of attacking network flows therefore makes it possible to detect, over the entire network, other targets and/or sources involved in the detected attack on a first target.

The collection method thus makes it possible to map attacks over the entire network with a view to responding thereto. The method thus differs from known methods that are based on analyzing the traffic in the network in a unitary manner in order to judge its malicious nature in absolute terms and one by one. By virtue of the proposed method, the attacking flow is sought in the entire communication network, that is to say from among all of the packets belonging to a flow defined by a first characteristic and corresponding to a detected attack on a first target. This makes it possible to protect other potential targets from the ongoing attack.

In one particular embodiment, at least one flow-processing rule has been identified. In a step E4, the analysis device 30 commands the control device 20 to install (Push RS), in the processing devices that it controls, a processing rule (RS) specific to the first characteristic and to the second characteristic (in proactive mode). This specific processing rule aims to collect information about the flow in the entire communication network. Installing this specific processing rule makes it possible to obtain information focused on the flow to be sought. At the end of an observation period (E5)(Wait), the control device 20 checks, in a step E6, whether the specific processing rule is active (?Act). If this specific processing rule is indeed active, then the flow to be sought is indeed being routed by the processing device applying this rule. If it is not active, the flow to be sought is not being routed by the processing device applying this rule. In a step E7, the processing device is not used (Rem D) in the context of the mapping of the attack.

In one particular embodiment, the identified flow-processing rule or rules make it possible to process at least one second flow separate from the flow to be sought. The processing device does store a rule that makes it possible to process the flow to be sought, but this rule also makes it possible to process this separate second flow. Specifically, it may be the case that a processing rule stored in a flow-processing table governs the processing of the flow to be sought without however being exclusively specific thereto. By way of example, the first characteristic corresponds to the IPv4 source IP address 192.1.2.15 and the processing rule includes, in the Match field, an IPv4 source IP address of the form 192.1.2.1X. This processing rule comprises all source IP addresses from 192.1.2.10 to 192.1.2.19. This processing rule is identified by the control device, but it is applied for flows separate from the flow to be sought. It may be active because it is processing a network flow that does not correspond to the flow to be sought.

Figure 3B:
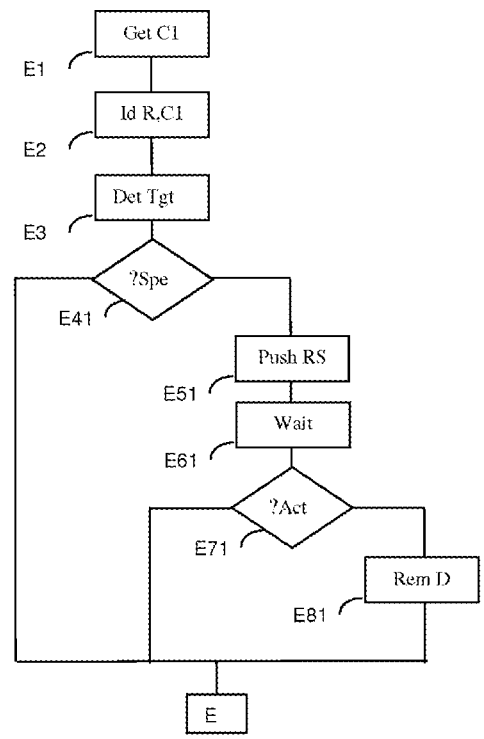

Thus, with reference to FIG. 3b, the analysis device 30 checks (?Spec), in a step E41, whether the identified processing rule is configured so as to process at least one second flow separate from the flow to be sought. If this is the case, in a step E51, the analysis device 30 commands (Push RS) the control device 20 to install, in the processing device applying the identified rule, a processing rule (RS) specific to the first characteristic (proactive mode). This specific processing rule aims to discriminate between the flow to be sought and the other second flows. Installing this specific processing rule makes it possible to obtain information focused on the flow to be sought. At the end of an observation period (E61) (Wait), the analysis device 30 checks, in a step E71, whether the specific processing rule is active (?Act). If this specific processing rule is indeed active, then the flow to be sought is indeed being routed by the processing device applying this rule. In one particular embodiment, the analysis device 30 commands the control device 20 to interrogate the processing devices in order to obtain a value of a counter Counters storing the number of packets processed using this specific processing rule in the flow-processing table 100. If it is not active, the flow to be sought is not being routed by the processing device applying this rule. In a step E81, the processing device is not used (Rem D) in the context of the mapping of the attack.

If, in step E41, the analysis device has determined that the identified processing rule is specific, the execution of the collection method is stopped for this identified processing rule and is implemented again for another identified processing rule, as the case may be.

In one particular embodiment, the analysis device 30 has also obtained a destination IP address of the flow to be sought. For example, the security application has sent the analysis device 30 the first characteristic and the destination IP address (the target of the attack). For certain types of attack, it may also be beneficial to collect information for a subnetwork to which the destination address is attached. This subnetwork corresponds for example to a company. The analysis device 30 commands the control device 20 to install, in the processing devices that it controls, a processing rule specific to the first characteristic and destined for the subnetwork to which the destination address belongs (proactive mode). At the end of an observation period, the analysis device 30 commands the control device 20 to interrogate the processing devices in order to obtain a value of a counter Counters storing the number of packets processed using this specific processing rule in the flow-processing table 100. The analysis device 30 may then analyze this counter value in order to analyze the behavior of the network access mechanism under attack and to judge the saturation of its network access mechanisms.

In order to supplement the information relating to a flow to be sought, the analysis device 30 commands the control device 20 to install any specific rule and checks the active nature of this rule, in order to refine its search for and its analysis of the attacking flows and their impacts. To this end, the analysis device 30 obtains information representative of an activity of the specific processing rule.

In one particular embodiment, the lifetime Timeout of the specific processing rule is set to the default value of 65.535 seconds.

The processing devices locally hold counters counting the number of packets processed per active rule, which the control device may consult periodically. This mechanism, which exists in SDN networks, allows the analysis device, in one particular embodiment, to take instantaneous measurements and a history of the volume of attacking network flows, which provide information about the mapping of the attacks and their variation over time.

In one particular embodiment, once the targets have been located by implementing the collection method, the network analysis with respect to the network endpoints is advantageously supplemented by and coordinated with local analysis of the computing resources (CPU, memory) consumed by the target or targets under attack by a locally running security application, in order to refine the analysis of the attacks.

Mapping the attacks also makes it possible to process the attack in the processing devices, for example to suppress attacking traffic or to divert same to a specialized probe for detailed analysis. To this end, the analysis device shares with the control device the action to be applied to the attacking flow, such that the control device installs the appropriate rule on the processing devices involved in the routing of the attacking flow.

The analysis of the attack over the entire network is easily focused on only attacking flows by searching for all of the packets corresponding to an attacking network flow that has been characterized by virtue of the attack being detected with respect to a first target. This is made possible by managing the processing rules, these being easy to access in this type of SDN network and being applicable to these sought flows. Network flow monitoring makes it possible, on the one hand, to carry out IP protocol analysis on attacking network flows since the network packets comprise source and destination IP address information, and, on the other hand, makes it possible to carry out topographic analysis allowing the targets to be located by "following" the mapped network flows. The network view of the attacks may thus be supplemented by a local view of the target computing resources impacted by the attacks.

It will be understood that this information collection technique makes it possible to efficiently detect, in the communication network, packets belonging to a given characterized network flow (associated with an attack detected with respect to a first target) that pass through different processing devices (or network equipments). It is then possible to identify the existence of other targets targeted by one and the same denial of service attack (with the same source IP address) based on the detection with respect to a first target. It is also possible to identify all of the computers involved in a distributed denial of service attack by mapping the flows in the communication network with the controller of this attack, starting from the detection with respect to a first infected computer.

The mechanisms for managing the transfer plane in software-defined communication networks ensure that processing rules are installed only in processing devices where they are actually used. These processing rules have a timeout beyond which they expire, such that the rules are present only in the processing devices where they are active and effectively applied in order to process flows falling under these rules. In other words, the presence, in a processing device, of a rule applicable to a given flow assumes the actual presence of this flow in this device (within the expiry time of the rule): specifically, in the absence of this flow, the processing rule would not have been installed or would have expired due to a lack of any flow-processing activity according to this rule.

The illustrative examples have been given on the basis of IPv4 addresses. No limit is attached to this type of address, with the technique being easily transposable to other types of address.

The collection technique has been described within the context of the OpenFlow protocol. No limit is attached to this protocol. This technique is also applicable to other protocols such as the BGP-LS (for "Border Gateway Protocol-Link State") protocol, or even the Cisco OpFlex protocol.

No limit is attached to these various embodiments, and a person skilled in the art will be able to define others that make it possible to collect information relating to a flow routed in a communication network based on the flow-processing rules and, as the case may be, by installing specific processing rules in processing devices.

Figure 4:
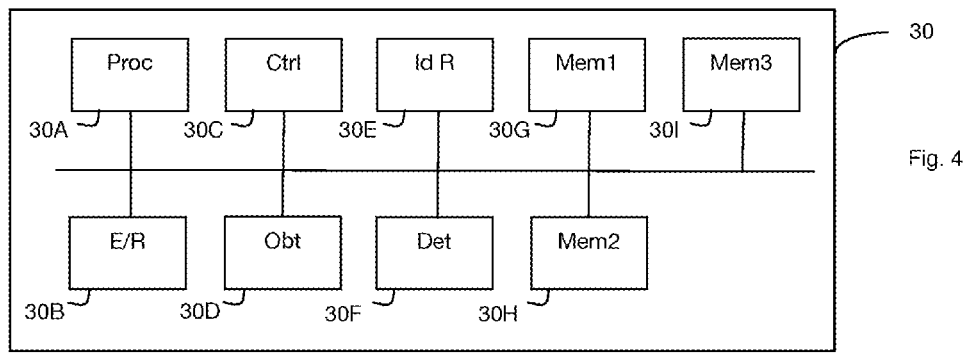
FIG. 4 shows an analysis device in one particular embodiment.

FIG. 4 schematically illustrates an analysis device in one particular embodiment.

The analysis device 30 attached to an application plane in a communication network comprises in particular:
- a processor 30A referenced "Proc" for executing code instructions of software modules;
- a communication module 30B referenced "E/R", forming a communication interface, designed to communicate with a control device in a control plane;
- a memory area 30G referenced "Mem1", designed to store a program that comprises code instructions for implementing steps of the method for collecting information relating to a flow routed in a communication network;
- a storage memory 30H referenced "Mem2", designed to store data used when implementing the method for collecting information relating to a routed flow;
- a storage memory 30I referenced "Mem3", designed to store flow tables respectively associated with processing devices under the command of a control device.

The analysis device 30 also comprises:
- a control module 30C referenced "Ctrl", designed to control a control device in a control plane via the communication interface;
- an obtainment module 30D referenced "Obt", designed to obtain a first characteristic associated with a first endpoint device of a flow to be sought in the communication network;
- an identification module 30E referenced "Id R", designed to identify at least one flow-processing rule configured so as to process a flow comprising the first characteristic and applied by a processing device;
- a determination module 30F referenced "Det", designed to determine a second characteristic, associated with a second endpoint device, based on the identified processing rule.

In one particular embodiment, the obtainment module 30D is designed to receive, from a security application, the first characteristic associated with a first endpoint device of a flow to be sought in the communication network.

In one particular embodiment, the determination module 30F is furthermore designed to determine a processing rule specific to the first characteristic and to the second characteristic on the basis of the identified processing rule, and the control module 30C is designed to command the control device to install the specific processing rule in the processing devices that it controls.

In one particular embodiment, the determination module 30F is furthermore designed to determine a processing rule specific to the first characteristic and to the second characteristic on the basis of the identified processing rule when the identified processing rule is configured so as to process at least one second flow separate from the flow to be sought, and the control module 30C is designed to command installation of the specific processing rule in the processing device applying the identified rule.

In one particular embodiment, the control module 30C is furthermore designed to obtain, from a control device, information representative of an activity of the specific processing rule.

In one particular embodiment, the determination module 30F is furthermore designed to determine a specific processing rule configured so as to process flows comprising the first characteristic and destined for a subnetwork to which a destination address characterizing the flow to be sought belongs, and the control module 30C is designed to command the control device to install the specific processing rule in the processing devices that it controls.

It is emphasized here that the analysis device 30 also comprises other processing modules (not shown in FIG. 4) designed to implement the various functions of this analysis device.

The technique for collecting information relating to a flow routed in a communication network is implemented by way of software and/or hardware components. In this regard, the term "module" may correspond in this document equally to a software component, to a hardware component or to a set of hardware and/or software components, able to implement a function or a set of functions, according to what is described above in respect of the module in question.

A software component corresponds to one or more computer programs, one or more subroutines of a program, or more generally to any element of a program or of software. Such a software component is stored in memory and then loaded and executed by a data processor of a physical entity, and is able to access the hardware resources of this physical entity (memories, recording media, communication buses, electronic input/output cards, user interfaces, etc.).

In the same way, a hardware component corresponds to any element of a hardware assembly. It may be a programmable or non-programmable hardware component, with or without an integrated processor for executing software. It is for example an integrated circuit, a chip card, an electronic card for the execution of firmware, etc.

In one particular embodiment, the modules 30C, 30D, 30E, 30F are designed to implement steps of the above-described method for collecting information relating to a routed flow that are implemented by a control device. These are preferably software modules comprising software instructions for executing those steps (or actions) of the above-described method for collecting information relating to a routed flow that are implemented by an analysis device. The invention therefore also relates to:
- a program for an analysis device, comprising program code instructions intended to command the execution of the steps (or actions) of the above-described method for collecting information relating to a routed flow when said program is executed by this analysis device;
- a recording medium able to be read by an analysis device and on which the program for an analysis device is recorded.

The software modules may be stored in or transmitted by a data medium. This may be a hardware storage medium, for example a CD-ROM, a floppy disk or a hard disk, or else a transmission medium such as an electrical, optical or radio signal, or a telecommunication network.

The invention also relates to a system 1 for collecting information relating to a flow routed in a communication network.

This system 1 comprises:
- in a data plane, packet-processing devices 10-14 that are configured so as to process packets on the basis of flow-processing rules,
- in a control plane, at least one control device 20 that is configured so as to control packet-processing devices and to manage said flow-processing rules and,
- an analysis device 30 as described above.

Although the present disclosure has been described with reference to one or more examples, workers skilled in the art will recognize that changes may be made in form and detail without departing from the scope of the disclosure and/or the appended claims.

The invention claimed is:

1. A collection method for collecting information relating to a flow routed in a communication network, said network comprising, in a data plane, packet-processing devices that are configured to process packets on the basis of flow-processing rules and, in a control plane, at least one control device that is configured to control the packet-processing devices and to manage said flow-processing rules, said method comprising following acts implemented by an analysis device:
  obtaining from a security application a first characteristic associated with a first endpoint device of a flow to be sought in the communication network;
  identifying, among all the flow-processing rules managed by the control device, any flow-processing rule configured to process the flow comprising the first characteristic as a source IP address, regardless of a destination IP address of the flow, and applied by at least one of the packet-processing devices; and
  determining a second characteristic, which is an IP address of a second endpoint device, based on the identified flow-processing rule, to identify the second endpoint device as target of an ongoing denial of service attack initiated by the first endpoint device or as another source device of an ongoing distributed denial of service attack initiated by the first endpoint device.

2. The collection method as claimed in claim 1, comprising commanding the at least one of the packet-processing devices to install a processing rule specific to the first characteristic and to the second characteristic.

3. The collection method as claimed in claim 1, comprising, in response to the identified flow-processing rule being configured to process at least one second flow separate from the flow to be sought, commanding the at least one of the packet-processing devices applying the identified flow-processing rule, to install a processing rule specific to the first characteristic and to the second characteristic.

4. The collection method as claimed in claim 2, comprising obtaining information representative of an activity of the processing rule specific to the first characteristic and to the second characteristic.

5. The collection method as claimed in claim 1, wherein the flow to be sought is further characterized by a destination address, and wherein the method comprises commanding installation of a specific processing rule in the at least one of the packet-processing devices, said specific processing rule being configured to process flows comprising the first characteristic and destined fora subnetwork to which the destination address belongs.

6. The collection method as claimed in claim 3, comprising obtaining information representative of an activity of the specific processing rule.

7. An analysis device designed to communicate with a control device, said control device being attached to a control plane in a communication network, configured to control packet-processing devices attached to a data plane in said network and to manage flow-processing rules applied by said packet-processing devices in order to process packets, said analysis device comprising:
a processor; and
a non-transitory computer-readable medium comprising instructions stored thereon which when executed by the processor configure the analysis device to:
obtain from a security application a first characteristic associated with a first endpoint device of a flow to be sought in the communication network;
identify, among all the flow-processing rules managed by the control device, any flow-processing rule configured to process the flow comprising the first characteristic as a source IP address, regardless of a destination IP address of the flow, and applied by at least one of the packet-processing devices; and
determine a second characteristic, which is an IP address of a second endpoint device, based on the identified flow-processing rule, to identify the second endpoint device as target of an ongoing denial of service attack initiated by the first endpoint device or as another source device of an ongoing distributed denial of service attack initiated by the first endpoint device.

8. A system for collecting information relating to a flow routed in a communication network, said system comprising:
in a data plane, packet-processing devices that are configured to process packets on the basis of flow-processing rules;
in a control plane, at least one control device that is configured to the control packet-processing devices and to manage said flow-processing rules; and
an analysis device comprising:
a processor; and
a non-transitory computer-readable medium comprising instructions stored thereon which when executed by the processor configure the analysis device to:
obtain from a security application a first characteristic associated with a first endpoint device of a flow to be sought in the communication network;
identify, among all the flow-processing rules managed by the control device, any flow-processing rule configured to process the flow comprising the first characteristic as a source IP address, regardless of a destination IP address of the flow, and applied by at least one of the packet-processing devices; and
determine a second characteristic, which is an IP address of a second endpoint device, based on the identified flow-processing rule, to identify the second endpoint device as target of an ongoing denial of service attack initiated by the first endpoint device or as another source device of an ongoing distributed denial of service attack initiated by the first endpoint device.

9. A non-transitory computer-readable recording medium on which a program is recorded that comprises instructions for implementing a method of collecting information relating to a flow routed in a communication network, said system comprising: in a data plane, packet-processing devices that are configured to process packets on the basis of flow-processing rules; and in a control plane, at least one control device that is configured to the control packet-processing devices and to manage said flow-processing rules, wherein the instructions, when executed by a processor of an analysis device configure the analysis device to:
obtain from a security application a first characteristic associated with a first endpoint device of a flow to be sought in the communication network;
identify, among all the flow-processing rules managed by the control device, any flow-processing rule configured to process the flow comprising the first characteristic as a source IP address, regardless of a destination IP address of the flow, and applied by at least one of the packet-processing devices; and
determine a second characteristic, which is an IP address of a second endpoint device, based on the identified flow-processing rule, to identify the second endpoint device as target of an ongoing denial of service attack initiated by the first endpoint device or as another source device of an ongoing distributed denial of service attack initiated by the first endpoint device.

* * * * *